United States Patent
Seehaus et al.

(10) Patent No.: US 7,974,783 B2
(45) Date of Patent: Jul. 5, 2011

(54) METHOD FOR DETERMINING A DISPLAY IMAGE

(75) Inventors: Timo Seehaus, Steinheim (DE); Joerg Armand, Muehlacker (DE); Christian Schmelzer, Leonberg (DE); Alexander Boehlendorf, Sindelfingen (DE)

(73) Assignee: Dr. Ing. h.c. F. Porsche AG, Stuttgart (DE)

( * ) Notice: Subject to any disclaimer, the term of this patent is extended or adjusted under 35 U.S.C. 154(b) by 529 days.

(21) Appl. No.: 12/172,590

(22) Filed: Jul. 14, 2008

(65) Prior Publication Data

US 2009/0015389 A1 Jan. 15, 2009

(30) Foreign Application Priority Data

Jul. 13, 2007 (DE) .................. 10 2007 032 698

(51) Int. Cl.
- G06F 17/10 (2006.01)
- G08G 1/16 (2006.01)
- G06K 9/48 (2006.01)

(52) U.S. Cl. .................. 701/300; 701/301; 382/242
(58) Field of Classification Search .................. 382/242, 382/181, 185, 197, 199–204, 291–297
See application file for complete search history.

(56) References Cited

U.S. PATENT DOCUMENTS

| | | | |
|---|---|---|---|
| 5,255,352 A * | 10/1993 | Falk | 345/582 |
| 5,363,479 A * | 11/1994 | Olynyk | 345/442 |
| 5,602,542 A | 2/1997 | Widmann | |
| 6,128,576 A | 10/2000 | Nishimoto et al. | |
| 6,650,235 B2 * | 11/2003 | Shirai et al. | 340/435 |
| 6,784,808 B2 | 8/2004 | Hoetzel et al. | |
| 6,862,527 B2 * | 3/2005 | Okamura et al. | 701/301 |
| 6,927,699 B2 * | 8/2005 | Samukawa et al. | 340/903 |
| 7,433,799 B2 * | 10/2008 | Lin et al. | 702/167 |
| 2003/0046003 A1 | 3/2003 | Smith et al. | |

FOREIGN PATENT DOCUMENTS

| | | |
|---|---|---|
| DE | 4333357 A1 | 4/1995 |
| DE | 297 03 903 U1 | 6/1997 |
| DE | 199 03 210 A1 | 1/2000 |
| DE | 199 63 755 A1 | 7/2001 |
| DE | 10352506 A1 | 6/2005 |
| DE | 10 2005 033 403 A1 | 1/2007 |
| WO | 2007/009833 A1 | 1/2007 |

OTHER PUBLICATIONS

Fitzek et al.,"Convergence of Mobile Devices and Wireless Sensor Networks" Wireless Word Research Forum (WWRF) 17, 2006, XP002489166, Heidelberg, Germany, pp. 3-4.
European Search Report dated Oct. 24, 2008.

* cited by examiner

*Primary Examiner* — Khoi Tran
*Assistant Examiner* — Bao Long Nguyen

(57) ABSTRACT

In order to determine an easily perceived display image for a driver assistance system, in particular a distance-measuring system or a parking assistant, a method makes use of the determination of Bezier curves on the basis of measured distance values on various measuring lines. Wherein different variants for the selection of the reference points and the curve edge points are available for the modeling and parameterization of the Bezier curves taking into account the respective current situation. It is also possible for object positions not to be taken into account under certain conditions in order to obtain smooth illustrative curves.

16 Claims, 7 Drawing Sheets

METHOD FOR DETERMINING A DISPLAY IMAGE

CROSS-REFERENCE TO RELATED APPLICATION

This application claims the priority, under 35 U.S.C. §119, of German application DE 10 2007 032 698.1, filed Jul. 13, 2007; the prior application is herewith incorporated by reference in its entirety.

BACKGROUND OF THE INVENTION

Field of the Invention

The invention relates to the field of automobile engineering, more precisely to the field of driver assistance systems which, in modern vehicles, assist the driver in coping increasingly well with traffic and driving situations which are becoming more and more complex.

For example speed and distance warning and control systems, brake and stability assistance systems, lane departure systems, distance warning systems and parking aids are known as such driving assistance systems.

Many of these systems have in common the fact that data on the surroundings which is acquired by sensors has to be displayed to the driver in an easily perceived form.

For this purpose, in particular in the field of distance warning systems and parking aids, sensor systems with ultrasonic transducers or Lidar and/or radar devices for measuring distance are known, with which devices the distance of the driver's own vehicle from obstacles or other road users can be determined in various directions.

The present invention is concerned in particular with generating in a comfortable and easily perceived way display images which are used for such systems.

Published, non-prosecuted German patent application DE 10 2005 033 403 A1 describes a method for measuring distance by use of radar, Lidar or acoustic waves, in which method an echo-propagation time is measured and evaluated. In order to determine the echo-propagation time more precisely, the reflected signal is compared with the emitted signal.

Published, non-prosecuted German patent application DE 199 63 755 A1, corresponding to U.S. Pat. No. 6,784,808, describes a device for measuring distance for motor vehicles in which a plurality of distance sensors are provided which can be operated in various ways in order to improve the quality of the measurements.

In this context it is known from the prior art to display, for example on a display, a vehicle in a schematic form viewed from above and to arrange various measuring bars around the vehicle, emanating radially from it, by which measuring bars the distances from obstacles can be displayed.

SUMMARY OF THE INVENTION

It is accordingly an object of the invention to provide a method for determining a display image which overcomes the above-mentioned disadvantages of the prior art methods of this general type, and to further improve such displays.

With the foregoing and other objects in view there is provided, in accordance with the invention, a method for determining a display image for a driver assistance system of a motor vehicle, from a plurality of measured distance values using at least one Bezier curve for representing sensed objects. The method includes the steps of: assigning the measured distance values to individual measuring lines; determining object positions of the sensed objects from given sensor positions, the individual measuring lines emanating from the given sensor positions and the measured distance values; combining adjacent ones of the measuring lines on which the object positions lie to form groups; defining object references points including a first and a second object reference point, each on one side of a respective one of the measuring lines and on a common orthogonal of the respective measuring line, for each measuring line on which an object position lies;

assigning each of the individual measuring lines a sensor measuring angle having limbs that intersect a measuring boundary line at sensor edge points; and determining a respective Bezier curve for each of the groups, the respective Bezier curve running through the object positions and ending at curve sensor edge points forming two outer sensor edge points of a respective group, and reference points of the respective Bezier curve of the respective group are formed by the object reference points of the respective group.

In this context, in order to generate a smooth, easily perceived line which represents possibly present objects appropriately, Bezier curves are used in a manner known per se. Basically other types of curve can also be used which, by using reference points and after adaptation of certain parameters, provide a balanced profile corresponding to the requirements. Specifically, Bezier curves have been known for a relatively long time from numerical mathematics for the production of graphics. Such curves use what are referred to as Berstein polynomials in order to represent smoothed curves and can be determined by a few parameters and are easy to handle.

There are Bezier curves of various degrees depending on the number of available reference points. In this context, a number of curve points are provided, in the present case these are object positions through which the curve which is produced runs, as well as curve edge points at which the curve ends.

Each object position is assigned here two Bezier object reference points for which basically different positions can be selected, as a result of which the shape of the curve changes while the predefined curve points are retained.

The idea of the invention is based on the condition that measured distance values which specify specific curve points are present on a respective individual basis for a plurality of distance sensors which are distributed on a vehicle. It has become apparent that arranging the object reference points and the curve edge points according to the invention gives rise to easily perceived and realistic representations of respectively sensed obstacles and boundaries.

The method according to the invention is independent here on the type and number of sensors which can be used for measuring distances.

Basically, it is possible to use ultrasonic transducers but radar systems and Lidar systems can also be used, in which case the sensors also do not need to be assigned individually to the measuring lines according to the invention if, for example, cross echoes are evaluated, or the like.

The only decisive factor is that distances from objects can be measured or determined in specific directions from the vehicle, which directions are given by the measuring lines.

These variables are required to carry out the method according to the invention as given object positions or measured distance values, considered from sensor positions which are defined on a virtual basis.

For this purpose, the device for determining a display image has a first memory device for storing the measured distance values and also for storing possibly present wall parameters if the distance from the vehicle is less than specific limiting values for individual measuring lines.

The sensor edge points which are used as boundary points in the calculation of corresponding Bezier curves are stored in a second memory device. In addition a Bezier calculation model is provided for calculating the respective Bezier curve for a group of measuring lines.

At first, the vehicle is typically illustrated in a schematic form viewed from above in the display image, with a measuring range of sensors which is located in front of or behind or else additionally to the side of the vehicle, and forms in each case in total approximately part of an annular ring sector which is bounded by an inner and an outer measuring boundary line. Obstacles lying on each side of the measuring boundary line are not sensed by the transducers and are not illustrated on the display system.

The Bezier curve which is generated by the method according to the invention constitutes, within the described circular sector, objects or obstacles which project into the circular sector.

The invention is intended to keep any steps or inaccuracies which may be produced due to the number of sensors or measuring lines as inconspicuous as possible in order to represent the contour of an obstacle in as smooth and realistic a fashion as possible.

For this purpose, one advantageous refinement of the invention provides that if at least three object positions which are assigned to adjacent measuring lines lie on a straight line taking into account specific maximum deviations, each of the respective measuring lines is assigned a wall parameter (wall flag), that it is checked whether adjacent measuring lines are each assigned a wall parameter, and that in this case the two object positions which are assigned to the corresponding measuring lines are connected to one another by a straight line or the reference points which are assigned to the object positions are arranged directly on the respective sensing line.

The described procedure is based on the idea that when a wall flag is set, i.e. when object positions are determined on three adjacent measuring lines and they lie approximately on a straight line, a line which passes through in as straight a fashion as possible should be generated. Such an object is best represented by a straight connection between two object positions, or respectively all the object positions, or by a variant of the Bezier curve in which the object reference points in the aforesaid region are placed directly on the respective sensing line or in its direct vicinity, in particular on the object position. The rest of the Bezier curve is completed according to the customary rules. As a result, a realistic display image of the straight walls is generated, for example, when the vehicle approaches a wall or drives into a garage.

Furthermore, in addition, it is advantageously provided that if a wall parameter is set for an outer lateral sensing line, in order to realistically determine the display image on the outside an additional virtual side sensing line, which is assigned a virtual object position and a wall parameter, is generated as well as the outer lateral sensing line.

An outer lateral sensing line needs to be understood as a sensing line which is respectively directed at the surroundings of the vehicle in the front lateral region where it is also possible to represent objects which the vehicle is passing close by to.

If the vehicle then travels close by a wall, a smooth contour would still not be represented solely by setting a wall parameter for the outer lateral sensing line. However, this can be achieved by additionally generating a virtual side sensing line with a corresponding virtual object position and a wall parameter which adds an object point to the corresponding Bezier curve and also generates a curve edge point in accordance with the virtual side sensing line. Correspondingly, the object reference points of the virtual object position can be combined with the latter.

In this way it is possible to implement a realistic image of a straight wall running to the side near to the vehicle.

This can be improved even further by also setting a wall parameter for the sensing line which is adjacent to the outer lateral sensing (measuring) line on the inside.

A further advantageous refinement of the invention provides that if a wall parameter is set for more than two immediately adjacent measuring lines, the two outer object positions for which wall parameters are set are taken into account in the determination of the display image and at least one of the other object positions between the two outer object positions is not taken into account.

It has become apparent that in the case of large obstacles with excessive dimensions which are located in the vicinity of the vehicle, the representation by use of straight lines at least in sub-regions of the Bezier curve improves the overall representation. Smoother contours are therefore obtained than would be achievable by use of calculations of a Bezier curve with all the curve points under the given conditions.

The application of this rule should, however, remain restricted to the measuring lines with the exception of the outer lateral measuring lines.

In addition, the display image can be improved in that if the measured distance value of a sensing line is smaller than the measured distance value of the sensing line which is adjacent thereto and the difference exceeds a given threshold value, the measured distance value of the adjacent sensing line is removed, while the corresponding sensor edge point remains unchanged.

If an object position lies very close to the vehicle, and directly adjacent on the next sensing line there is an object position at a large distance therefrom, a highly stepped, irregular contour would be formed which can be avoided by deleting the sensed object position which corresponds to a relatively large distance from the vehicle. However, in this context, the curve edge point is retained as the sensor edge point of that sensing line on which the object position would be deleted.

This rule should also advantageously be restricted only to the measuring lines with the exception of the outer measuring lines.

The sensor measuring angle of a sensing line can advantageously also be defined in dependence on the measured distance values which are present.

In this context, the sensor measuring angles can be defined individually, but also jointly for all the measuring lines.

The sensor measuring angle can be selected in dependence on the absolute value of the difference between the measured distance values which are present, in particular the absolute value of the difference between two adjacent measured distance values. It is advantageous in this context to select the sensor measuring angle individually or collectively in direct proportion to the difference, for example the average or the minimum difference, between the measured distance values which are present. This can also basically apply to subgroups from the number of measuring lines.

The aforesaid determination of the sensor measuring angles, in particular in the case of large differences between the measured distance values, causes the Bezier curve to be flattened by the curve edge points which are widely spaced apart so that a relatively smooth contour is produced.

The sensor measuring angles influence the Bezier curve which is produced insofar as the respective sensor edge points are defined by the Bezier curve at their points of intersection with the outer measuring boundary line, that is to say the one which is furthest away from the motor vehicle, of the measured distance range, in which case the respectively outermost sensor edge points of a group of measuring lines form the curve edge points of the Bezier curve.

A further advantageous refinement of the invention can also provide that for each sensing line for which a measured distance value is present, the distance of the individual object reference points from the sensing line is determined in dependence on the measured distance values of the sensing line and their sensing line which is adjacent in the direction of the respective object reference point.

This idea permits the two object reference points which are respectively assigned to a sensing line to be arranged at different distances from the sensing line, in which case the distance depends in each case on how large the difference is between the measured distance values of the two measuring lines which are adjacent to the respective object reference point.

If the measured distance values of adjacent measuring lines differ greatly, the distance of the corresponding object reference point, which lies between the two measuring lines, from the assigned sensing line would be very large. If there is only a small difference between the measured distance values, the corresponding object reference point would be arranged relatively close to the sensing line which is assigned to it.

The distance of the object reference points from the measuring lines which are respectively assigned to them can be proportional here to the aforesaid differences between the measured distance values with a proportionality constant which is common to all the distances so that the calculation of the object reference points for all the measuring lines is simplified overall.

In this context, it is possible for boundaries to be provided in the determination of the distances of the object reference points from the respective sensing line by use of a minimum distance and a maximum distance.

It is also advantageously possible to provide that the position of the object reference points along the sensing line which is assigned to them is at the same height as the respectively present object position.

This results in a particularly simple calculation of the object reference points with a particularly smooth Bezier curve.

However it is also possible to provide that when there is a group of measuring lines, the positions of the object reference points along the measuring lines which are assigned to the object reference points are approximated to one another on the basis of the height of the respective measured distance values.

Therefore when there are adjacent measuring lines for which object positions are respectively present, the object reference points along their respective sensing line do not lie at the height of the object position but rather are displaced along the respective measuring line in such a way that the heights of the object reference points of various measuring lines are at least partially approximated to one another. A condition for this is that the corresponding measuring lines extend at such an acute angle to one another that the positions of the object reference points along the measuring lines can be compared.

In groups of more than two measuring lines which each have object positions, the heights of the object reference points along the respective measuring lines can be approximated to a common mean value.

The invention can be advantageously configured with respect to changes in the sensing of objects over time by virtue of the fact that the display image is determined repeatedly, and that, when there are changes in the measured distance values between a display image which is present and a subsequent determination, only part of the difference from the data of the display image which is present is taken into account in the determination.

In this context, the situation can change rapidly, on the one hand, as a result of a movement of the vehicle and, on the other hand, also due to objects moving closer to the vehicle. For this reason, the display image is repeatedly calculated anew, in which case the time sequence may be periodic but also may be dependent on the occurrence of changes.

In order to be able to prevent measuring inaccuracies but also incorrect measurements and the occurrence of what are referred to as phantom objects (mirroring of objects owing to individually disrupted measurements), a newly calculated display image is changed to a lesser degree when measured values/measured distance values change than would correspond to the changed measured values. This can be achieved, for example, by what are referred to as attenuation factors as a result of which a new display image is not based on the latest measured value but rather an intermediate value between an already previously available measured value and a new measured value. By use of new calculations which continue to occur, the value on which the image to be newly calculated is based is approximated in each step to the actual measured value. In this way, the data on which the current display image is based approximates asymptotically to the real measured data. Individual random values among the measured values can be smoothed out by this method.

The method can specifically be configured by virtue of the fact that in each case the difference between the data on which the previous display image is based and the current measured value is formed and this difference is multiplied by an attenuation factor of less than one, and the resulting correction value is added to the previously used measured data.

Multiple application of this step causes the measured data which is actually present to be taken into account asymptotically.

The invention is based not only on the described method but also on a device for determining a display image and on a driver assistance system with a sensor system for sensing and outputting measured distance values and, if appropriate, wall parameters, and with a device. The corresponding sensor system can supply both the measured distance values and the wall parameters if the limiting values are less than the individual measuring lines.

However, corresponding wall parameters can also be acquired in the device for determining the display image by calculation from the measured distance values which are present. However, integrating this function into the sensor system helps to save time and helps to make it possible for warnings which are due when object distances are reduced to be made available more quickly and with less susceptibility to faults.

Other features which are considered as characteristic for the invention are set forth in the appended claims.

Although the invention is illustrated and described herein as embodied in a method for determining a display image, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
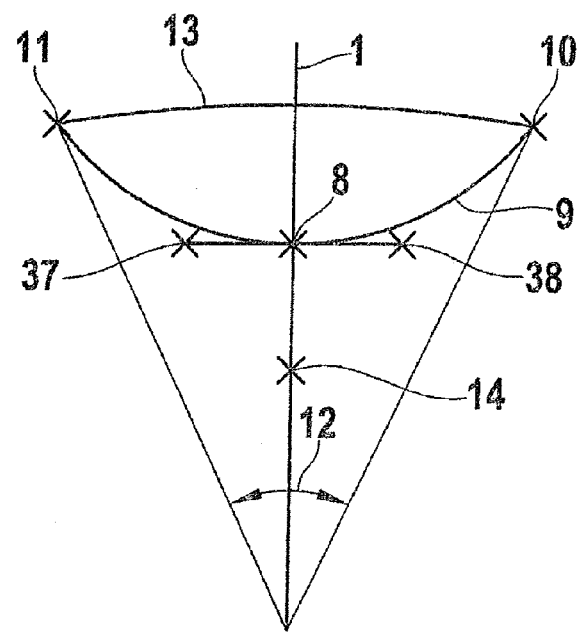
FIG. 1 is an illustration of a sensing line with a sensor measuring angle, two object reference points and a Bezier curve according to the invention.

Referring now to the figures of the drawing in detail and first, particularly, to FIG. 1 thereof, there is shown by way of example, a sensing line 1 which, for example in the case of a vehicle, can indicate the direction in which a sensor for sensing objects with its sensing cone is oriented.

However, it is also possible to provide that object positions of sensed objects can be determined by a more complex system, for example by cross echoes. Object positions which are determined on previously defined measuring lines are advantageously defined for application of the method according to the invention but these can also be determined from object positions in the course of the method.

In the present case, there is, for example, an object position 8 whose coordinates are known in the system or can be determined from a measured distance value, for example.

The object of the invention is to determine a Bezier curve (designated by 9) through the object position 8 and through curve edge points 10, 11. In this context, the curve edge points 10, 11 are given by the intersection points of a sensor measuring angle 12 with a measuring boundary line 13. However, it is also possible to predefine curve edge points outside the measuring range.

The sensor measuring angle 12 is approximately symmetrical around the measuring line 1 but in the size of its angles it is given only by the modeling during the determination of a Bezier curve, independently of the measuring physics. Given the free selection of the sensor measuring angle 12, the nature of the resulting Bezier curves can be predefined—flatter in the case of relatively large sensor measuring angles and steeper in the case of more acute angles. The sensor measuring angles can be identical, for example, for all the measuring lines of a sensor group, but it is also possible to select them individually.

The measuring boundary line 13 is essentially given by the distance from the vehicle in which objects are still to be sensed and represented.

Furthermore, two object reference points 37, 38 are represented which serve to calculate the Bezier curve and their position contributes to a suitable configuration of the display image.

Furthermore, FIG. 1 shows a limiting value 14 for object positions, which limiting value 14 specifies the distance from the motor vehicle below which a wall parameter (wall flag) is set. The setting of the wall flag can occur either during the determination of the object distances in the sensors or else during the post-processing of the measured values within the scope of the method according to the invention.

The use of wall flags is based on the idea that when there are relatively large objects which are detected by a plurality of sensors or on a plurality of measuring lines which are directly adjacent to one another in an approximately linear arrangement, the probability of a smooth contour, such as for example in the case of a wall which the vehicle is approaching, is particularly large, but at the same time measuring errors can occur which may lead to a discontinuous or irregular representation. For this reason, the system provides the option that if two measuring lines which lie one next to the other have corresponding object positions with set wall parameters, these object positions are not connected to one another by a mostly curving Bezier line but rather on this part the curve is continued as a straight line. As a result, a more realistic image of the sensed object is generally produced.

Figure 2:
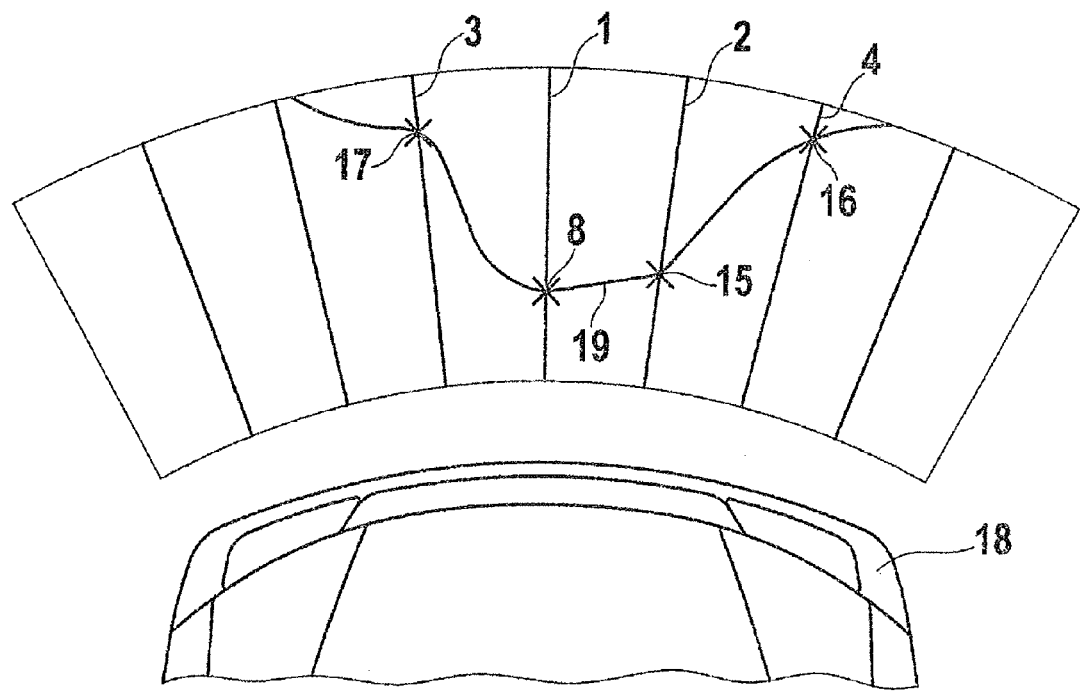
FIG. 2 is an illustration showing a plurality of measuring lines with object positions and a Bezier curve running through them.

This fact is presented more precisely in FIG. 2 in which the measuring lines 1, 2, 3, 4 are given with corresponding object positions 8, 15, 16, 17 for a vehicle 18. If the object positions 8, 15, 16 were located approximately on a straight line, wall flags would be set for the measuring lines 1, 2 and 4 and the corresponding line between these object points would be represented as a straight line 19 or in this region the object reference points would be moved to the object position or close to it, which would lead to a very stretched, approximately straight configuration of the Bezier curve in this region. In the adjoining regions, the Bezier curve is continued in all cases.

However, such a procedure is advantageously provided only if there are a plurality of object positions, in particular at least three, on adjacent measuring lines for which wall parameters are respectively set.

Figure 3:
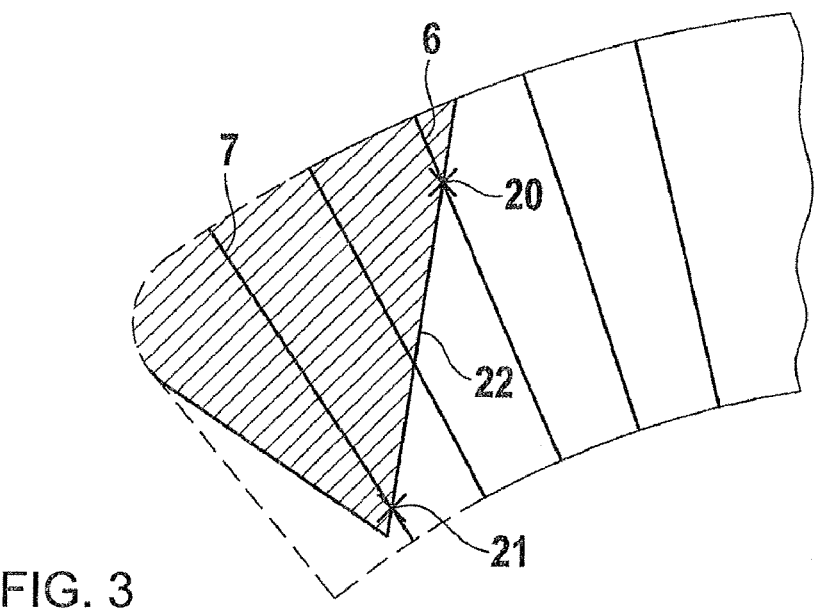
FIG. 3 is an illustration showing a virtual side sensing line and a straight line between two object positions.

In FIG. 3, the use of the wall flags is shown in more detail in conjunction with obstacles, in particular walls, which are located to the side in front of the vehicle. An outer lateral sensing line 6 is illustrated there with an object position 20 which is less than a corresponding limiting value so that a wall flag is set there.

In order to represent a straight line using the method according to the invention, for this specific case the possibility is provided of producing an additional, virtual side sensing line 7 for which there is no corresponding object sensing process in the system. An object position 21 is assumed on the virtual side sensing line 7 and in each case a wall flag is set, causing the object positions 20 and 21 to be connected to one another by a straight part of the line. The object position 21 can be selected individually in such a way that the connecting straight line 22 is in the desired direction, for example parallel to the vehicle, or a standard position can also be assumed.

In this way, the surface which is shown hatched in FIG. 3 can be colored in so that the representation of a wall is produced if the display image is considered on the left-hand front side of the vehicle.

Figure 4:
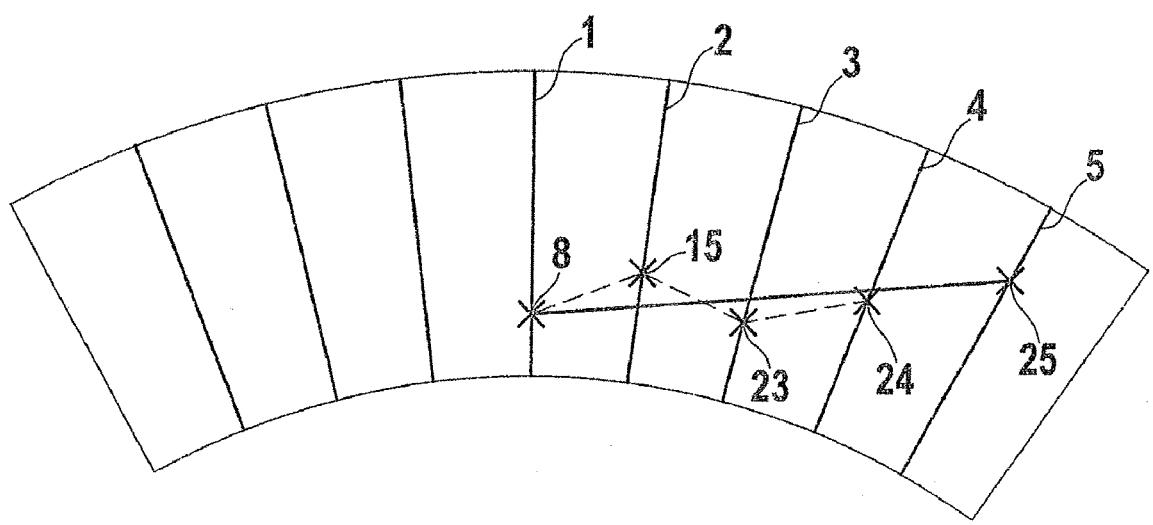
FIG. 4 is an illustration showing a plurality of object positions with wall flags which are connected to one another by a straight line.

In addition, on the next adjacent sensing line it is also necessarily possible to set a wall flag in order also to provide the straight connection to the object position 20 there with a suitable object position and therefore improve the image further. FIG. 4 illustrates that when there are a plurality of object positions 8, 15, 23, 24, 25 for each of which a wall flag is set, according to one embodiment of the invention not all the object positions are connected to one another respectively in pairs by use of straight parts of lines (version shown by dashed lines) but rather in this case one or more of the object positions between the outermost object positions with wall flag, in the present case 8 and 25, can be ignored and only the outer ones connected by a straight part of the line. As a result, a clear contour of a displayed object in the sensing field is produced.

Figure 5A:
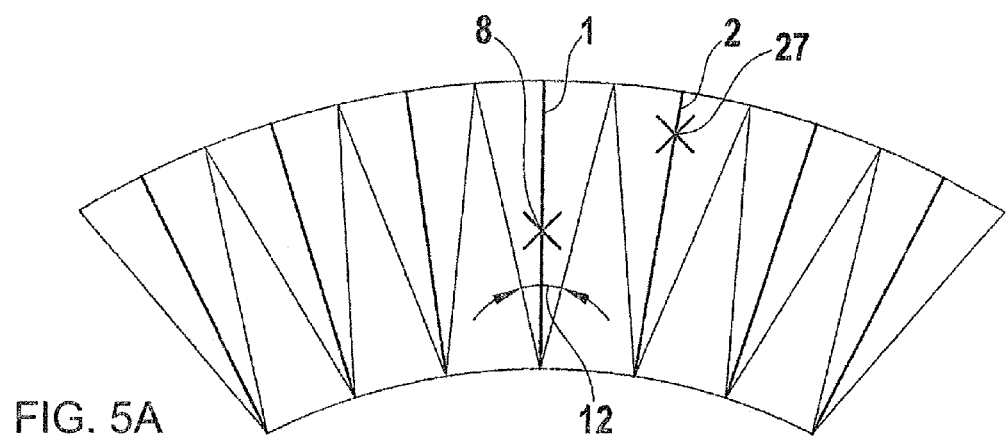
FIGS. 5A-5C are illustrations showing a plurality of measuring lines with object positions and two variants of a Bezier curve which is determined from them.
Figure 5B:
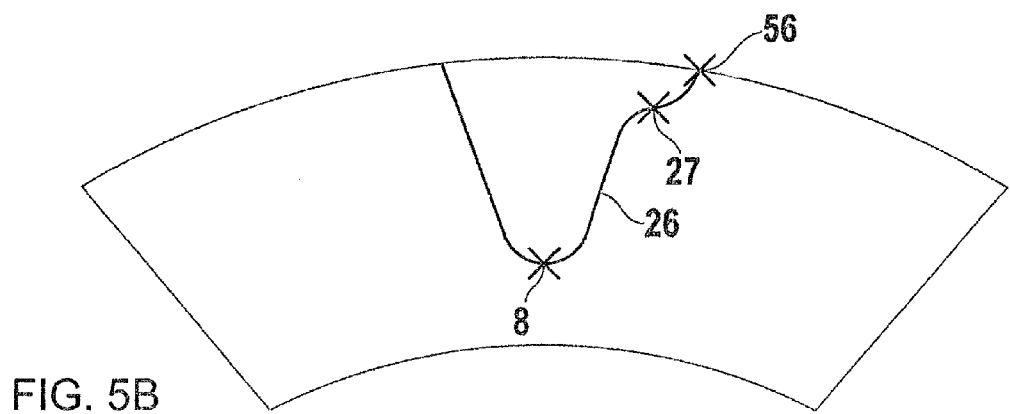
Figure 5C:
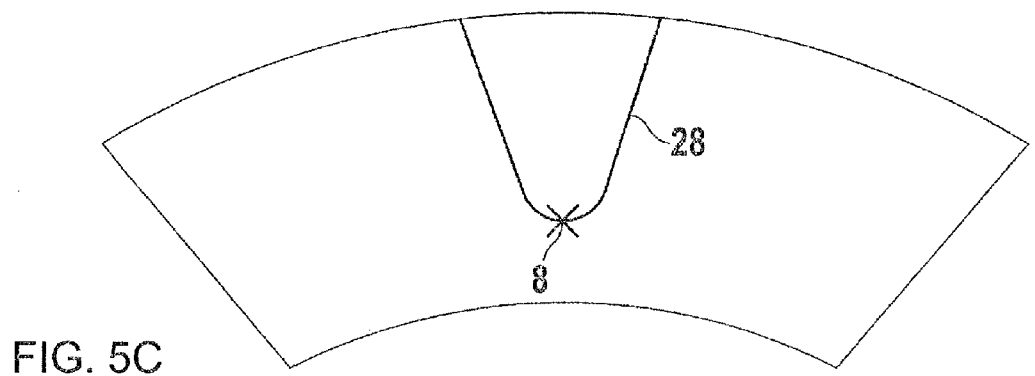

FIGS. 5A-5C show, in the case of a plurality of measuring lines 1, 2, the sensor measuring angles 12 which are respectively assigned to the lines and sensed object positions 8, 27 and a curve edge point 56.

Illustrations are given of the two variants according to which the Bezier curve 26 is calculated in the central part of the figure, FIG. 5B, taking into account all the object positions 8, 27, and in the lower part of the figure, FIG. 5C, the Bezier curve 28 in which the curve edge points are also selected as in the case of the Bezier curve 26, specifically as sensor edge points of the corresponding measuring lines 1, 2, in which case, however, because of the large difference between the measured distance values of the object positions 8, 27 the point 27 which lies closer to the edge and is further away is not taken into account in the calculation of the Bezier curve. The resulting Bezier curve 28 appears more convincing due to the smoothed contour and is simplified without disadvantages in terms of the information content of the display image.

Such a procedure is appropriate if the difference between the measured distance values of two adjacent object positions 8, 27 exceeds a specific threshold value.

Figure 6A:
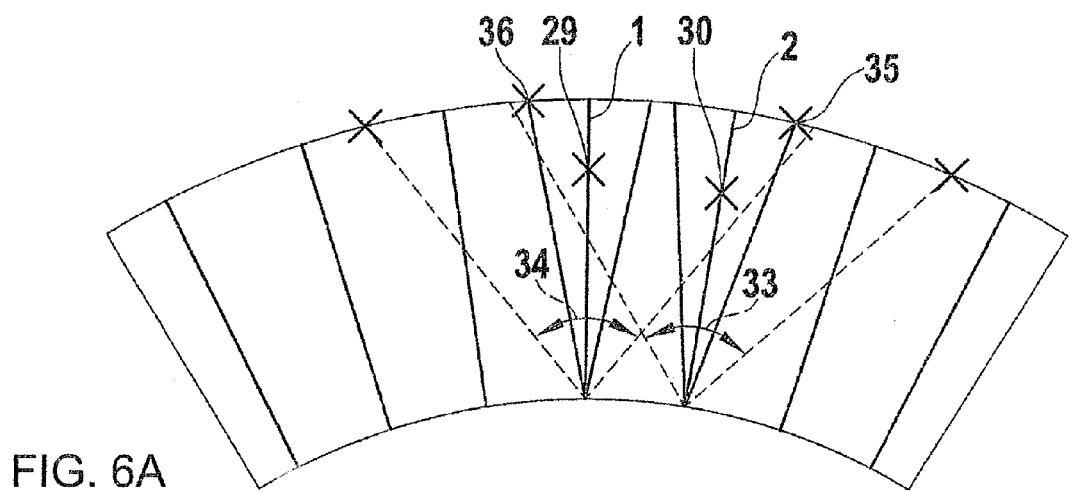
FIGS. 6A-6B are illustrations showing a plurality of measuring lines with object positions and a plurality of Bezier curves which are calculated therefrom with various sensor measuring angles.
Figure 6B:
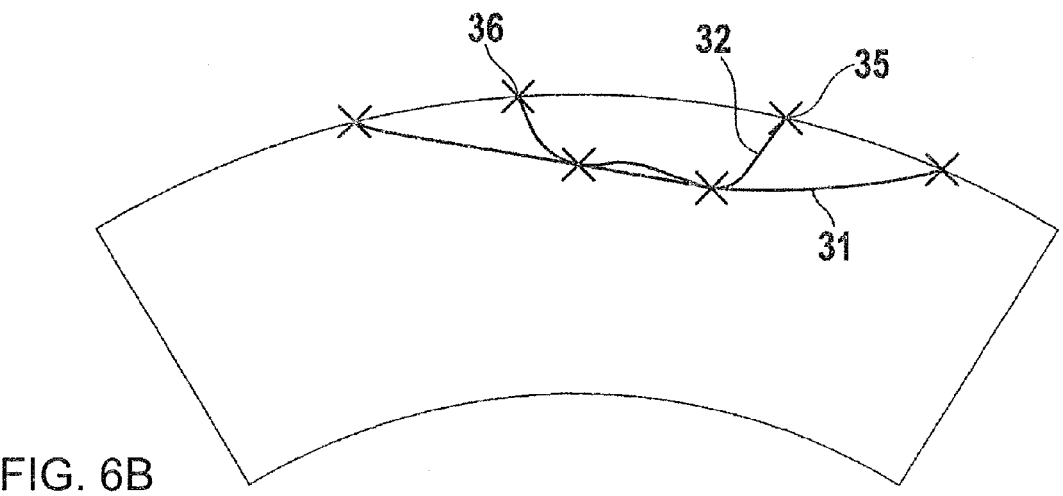

FIGS. 6A, 6B show two measuring lines 1, 2 with object positions 29, 30 and two variants 31, 32 of the specific Bezier curve as a function of the underlying sensor measuring angles. The determination of the Bezier curve 31 is based on a further sensor measuring angle (represented by dashes in the FIG. 6A and designated by the reference symbols 33, 34), while the Bezier curve 32 is respectively based on a smaller sensor measuring angle with curve edge points 35, 36. In this way it is possible to determine the nature of the generated Bezier curve through suitable selection of the sensor measuring angles.

Figure 7:
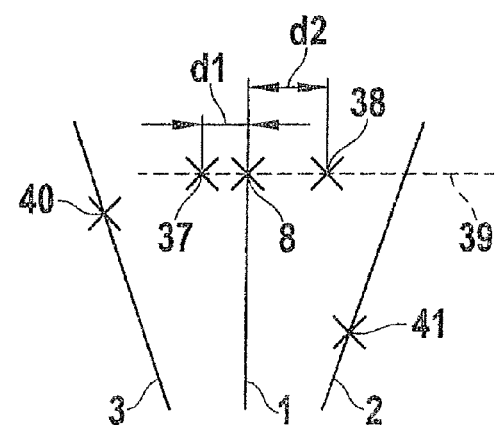
FIG. 7 is an illustration showing three measuring lines with object reference points which are at different distances from the corresponding measuring lines.

FIG. 7 illustrates the determination of object reference points 37, 38 for the sensing line 1 with an object position 8, where the distances d1, d2 from the sensing line 1 can basically be the same. The object reference points can be arranged on an orthogonal 39 with respect to the sensing line 1. In many situations it may be advantageous for the distances d1, d2 to be determined taking into account the object positions 40, 41 of adjacent measuring lines 2, 3, where d1, d2 may be proportional to the difference between corresponding measured distance values on the respective side of the sensing line 1 with a predefined proportionality factor. Under certain circumstances, the shape of the Bezier curve can also be improved as a result of this.

Figure 8A:
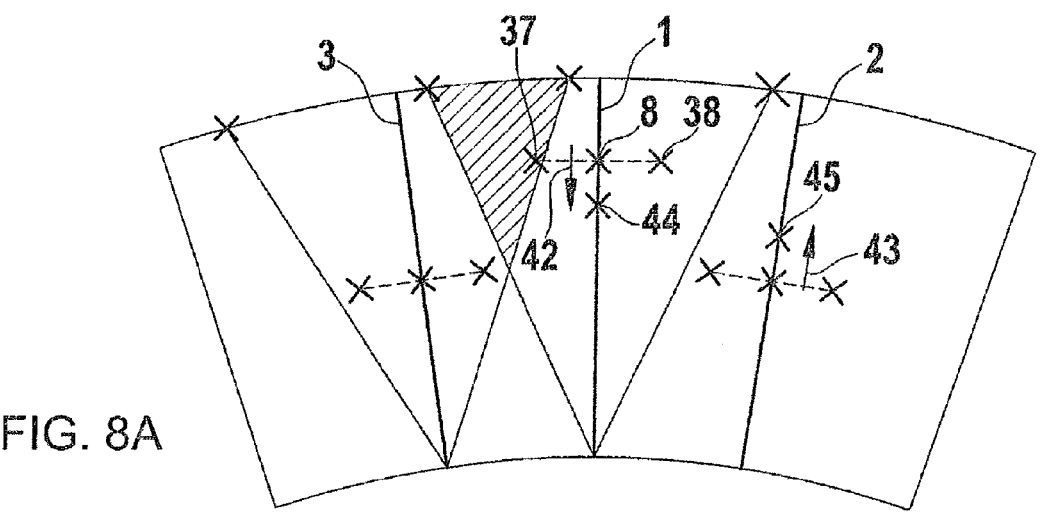
FIG. 8A is an illustration showing a plurality of object reference points which are displaced in pairs along the measuring lines.

FIG. 8A illustrates that the height of the object reference points 37, 38 along the sensing line 1 can also be changed taking into account the measured distance values of the measuring lines 1, 2. In FIG. 8A, it is indicated by the arrows 42, 43 that the corresponding object reference points are displaced to the height of the respectively indicated points 44, 45 and can therefore be approximated to one another for adjacent measuring lines 1, 2.

Figure 8B:
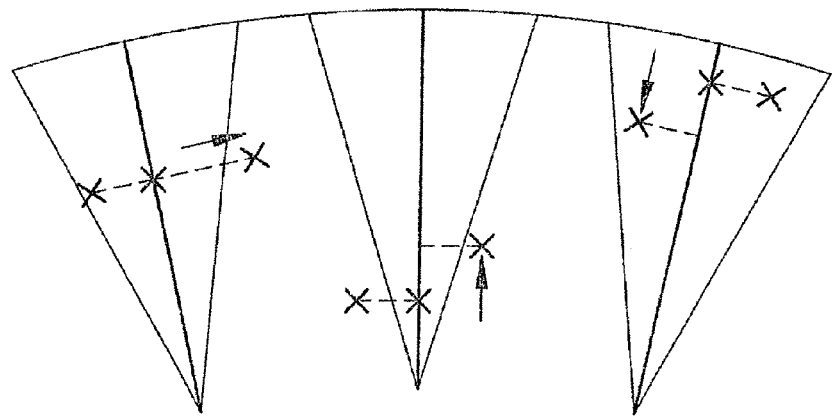
FIGS. 8B and 8C are illustrations showing object reference points which are selectively displaced individually in terms of distance and height with respect to the respective sensing line.
Figure 8C:
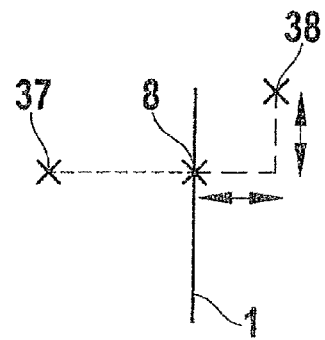

The object positions through which the Bezier curve which is produced runs therefore remain unchanged and only the object reference points are displaced. In FIGS. 8B and 8C it is also shown that values can be selected for the corresponding sensor measuring angles which are so large that they overlap one another, as can be seen in the hatched region. In FIGS. 8B and 8C there is additionally an illustration in the lower region of the fact that individual reference points can also be selectively displaced along the respective sensing line (in terms of height) and/or in terms of their distance perpendicular to the respective sensing line. Possible distributions of reference points are shown in the upper region of the figure.

Figure 9:
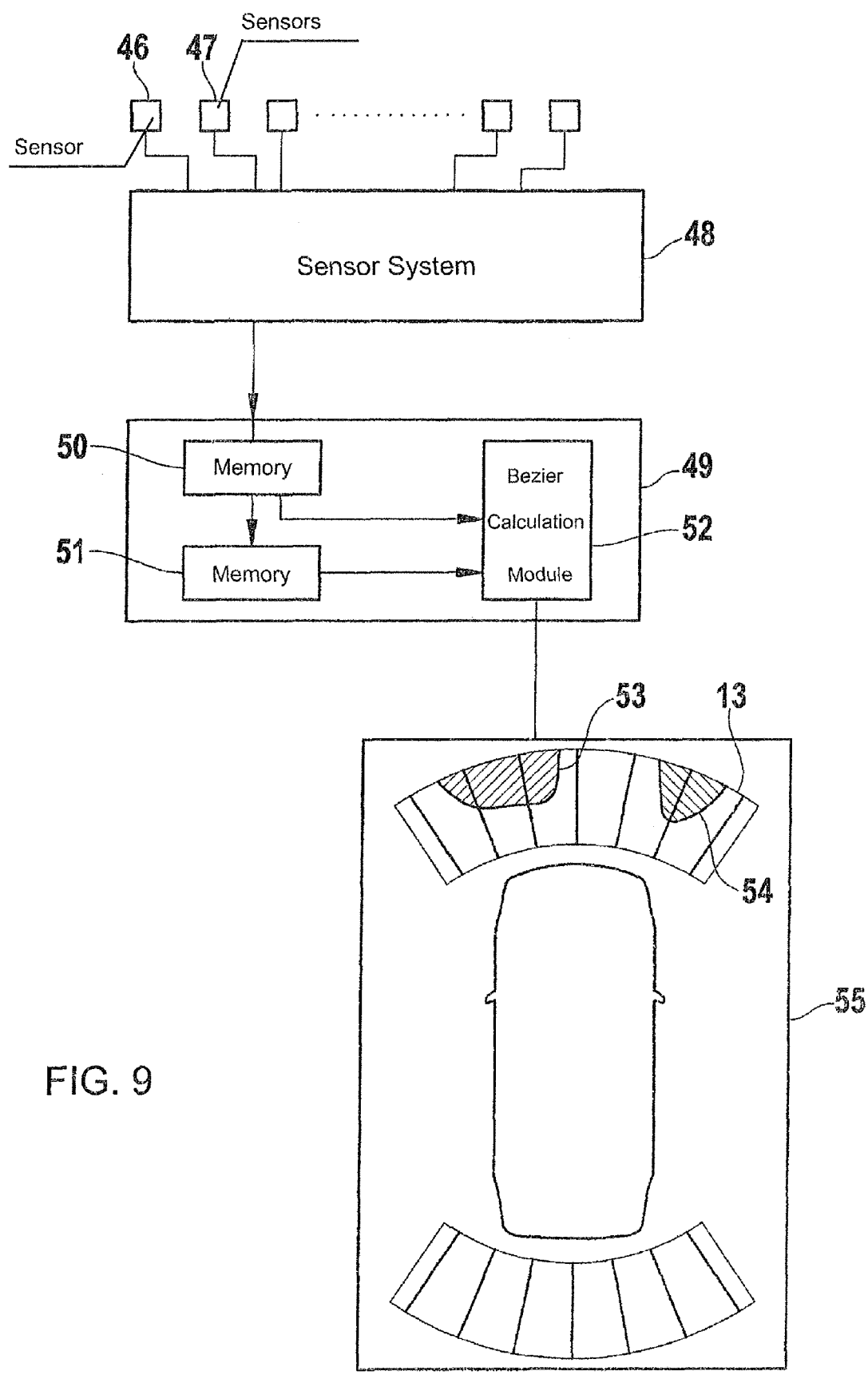
FIG. 9 is an illustration showing a device according to the invention for generating a display image.

FIG. 9 shows by way of example a complete driver assistance system with a device for carrying out the method according to the invention, i.e. for generating a display image.

Physical sensors 46, 47 by which object positions which lie on the given measuring lines 1, 2, 3, 4, 5, 6 are determined with a sensor system 48 are displayed. In addition, corresponding wall parameters can also be set in the system. The values which are determined are transmitted to a device 49 for carrying out the method, where, in a first memory device 50, the object positions or measured distance values are stored, and in a second memory device 51 the sensor edge points are stored. By taking into account one or more rules with which the invention can advantageously be configured, one or more Bezier curves 53, 54 which are integrated into a display image 55 are determined in a Bezier calculation module 52. The respective Bezier curves 53, 54 are each closed by a sensing boundary line 13 so that closed areas, which can be colored in by a simple graphic program and are illustrated by hatching in the FIG. 9, are produced, the areas permitting a driver to recognize obstacles in the sensing region of the driver assistance system.

The calculation unit can optionally be integrated into various systems. It may be part of the sensor system, part of the display system or else a separate unit.

Figure 10A:
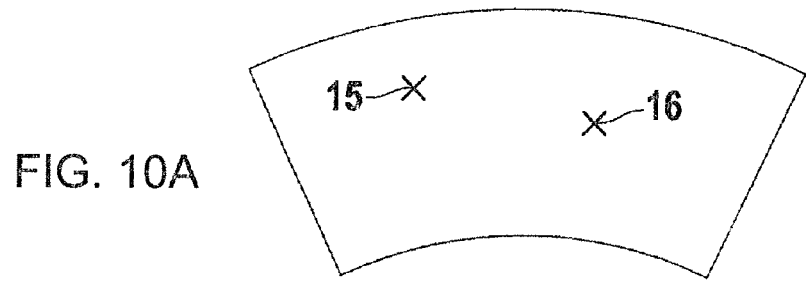
FIGS. 10A and 10B are illustrations showing an assignment of the object positions to dynamically generated measuring lines.
Figure 10B:
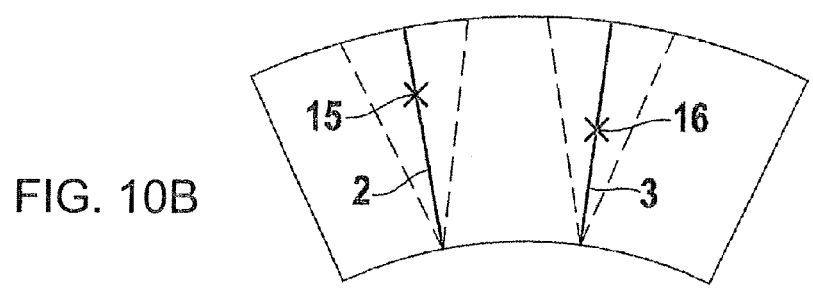

Corresponding systems may be provided both for the area in front of the vehicle and for the area behind the vehicle. FIGS. 10A, 10B show, in the upper part, two sensed object positions 15, 16 which can be used to generate dynamic measuring lines 2, 3 on which these object positions lie. The rest of the method can then be based on this data which is generated in this way by defining measuring angles, reference points and further parameters.

Figure 11A:
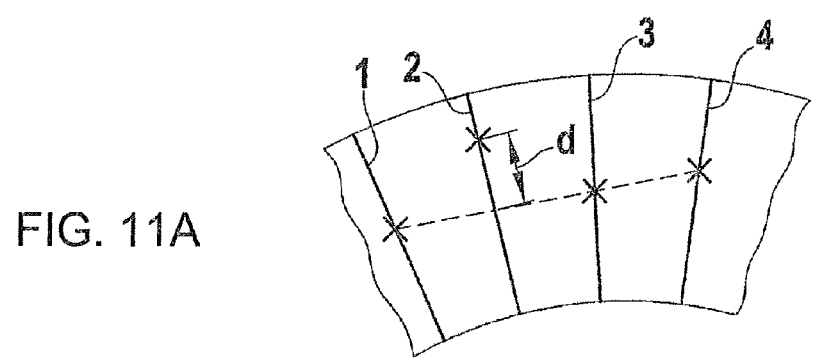
FIGS. 11A and 11B are illustrations showing a mechanism for setting wall flags.
Figure 11B:
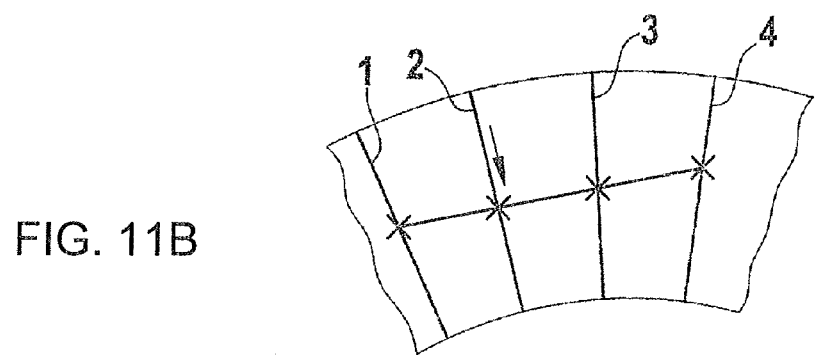

FIGS. 11A, 11B show a method for setting wall parameters (wall flags) in which it is initially determined whether a straight line can be placed through at least three object positions of adjacent measuring lines. This can be based on linear regression or on the comparison of angular deviations in connection with various object position pairs and the presence of a straight line can be assumed if the deviation d of object positions from a compensation straight line remains below a specific, definable threshold value.

In this case, all the corresponding object positions/measuring lines may be assigned wall parameters. The object positions can then be respectively connected in sections or overall by a straight line or the corresponding object reference points are placed without distances on the measuring lines, in particular on the object position points themselves, in order then to calculate a Bezier curve. The aforesaid positioning of the reference points causes the resulting Bezier curve in this region to assume a very stretched, approximately straight form.

The method according to the invention is prepared in such a way that it can be used for changing configurations, in particular changing numbers of measuring lines, without manual parameterization.

The invention claimed is:

1. A method for determining a display image for a driver assistance system of a motor vehicle, from a plurality of measured distance values using at least one Bezier curve for representing sensed objects, which comprises the steps of:
    assigning the measured distance values to individual measuring lines;
    determining object positions of the sensed objects from given sensor positions, the individual measuring lines emanating from the given sensor positions and the measured distance values;
    combining adjacent ones of the measuring lines on which the object positions lie to form groups;
    defining object references points including a first and a second object reference point, each on one side of a respective one of the measuring lines and on a common orthogonal of the respective measuring line, for each measuring line on which an object position lies;
    assigning each of the individual measuring lines a sensor measuring angle having limbs that intersect a measuring boundary line at sensor edge points; and
    determining a respective Bezier curve for each of the groups, the respective Bezier curve running through the object positions and ending at curve sensor edge points forming two outer sensor edge points of a respective group, and reference points of the respective Bezier curve of the respective group are formed by the object reference points of the respective group.

2. The method according to claim 1, wherein if at least three of the object positions which are assigned to adjacent measuring lines lie on a straight line taking into account specific maximum deviations, each of the adjacent measuring lines is assigned a wall parameter, and it is checked whether the adjacent measuring lines are each assigned the wall parameter, and in that in this case the two object positions which are assigned to the corresponding measuring lines are connected to one another by a straight line or the object reference points which are assigned to the object positions are arranged directly on the respective measuring line.

3. The method according to claim 2, wherein if the wall parameter is set for an outer lateral sensing line, in order to determine the display image on an outside, an additional virtual side sensing line, which is assigned a virtual object position and a wall parameter, is generated as well as the outer lateral sensing line.

4. The method according to claim 3, wherein the wall parameter is also set for the measuring line adjacent to the outer lateral sensing line on an inside.

5. The method according to claim 2, wherein if the wall parameter is set for more than two immediately adjacent measuring lines, the two outer object positions for which the wall parameters are set are taken into account in a determination of the display image and at least one of the other object positions between the two outer object positions is not taken into account.

6. The method according to claim 1, wherein if a measured distance value of the measuring line is smaller than a measured distance value of the measuring line which is adjacent thereto and a difference exceeds a given threshold value, the measured distance value of the adjacent measuring line is removed, wherein a corresponding curve edge point remains unchanged.

7. The method according to claim 5, which further comprises restricting the application to the measuring lines with an exception of outer measuring lines.

8. The method according to claim 1, which further comprises defining the sensor measuring angle in dependence on the measured distance values.

9. The method according to claim 8, which further comprises defining the sensor measuring angles of two adjacent ones of the measuring lines for which the measured distance values are present in dependence on an absolute value of a difference between the measured distance values.

10. The method according to claim 9, which further comprises selecting the sensor measuring angles in direct proportion to the difference between the measured distance values.

11. The method according to claim 8, which further comprises defining a same values for all the sensor measuring angles.

12. The method according to claim 1, wherein for each of the measuring lines for which a measured distance value is present, a distance of the object reference points from the respective measuring line is determined in dependence on the measured distance values of the respective measuring line and the measuring line which is adjacent in a direction of the object reference point.

13. The method according to claim 12, wherein the distance of the object reference point from the respective measuring line is proportional to a difference between the distance values of the two adjacent measuring lines with a proportionality constant which is common to all the distances.

14. The method according to claim 1, wherein a position of the object reference points along the respective measuring line which is assigned to the respective measuring line is at a same height as the respectively object position.

15. The method according to claim 1, wherein when there is a group of the measuring lines, positions of the object reference points along the measuring lines which are assigned to the object reference points are approximated to one another on a basis of a height of the measured distance values.

16. The method according to claim 1, which further comprises determining the display image repeatedly, and when there are changes in the measured distance values between the display image which is present and a subsequent determination, only part of a difference from data of the display image which is present is taken into account in a determination.

* * * * *